United States Patent [19]

Takiguchi et al.

[11] Patent Number: 5,064,697

[45] Date of Patent: Nov. 12, 1991

[54] SUBSTRATE WITH A LIQUID CRYSTAL POLYMERIC THIN FILM AND METHOD FOR MANUFACTURING THE SAME

[75] Inventors: Yasuyuki Takiguchi, Kawasaki; Akihiko Kanemoto, Yokohama; Shigeki Iida, Kawasaki; Takehiro Toyooka, Yokohama, all of Japan

[73] Assignees: Ricoh Company, Ltd.; Nippon Oil Company, Limited, both of Tokyo, Japan

[21] Appl. No.: 532,681

[22] Filed: Jun. 4, 1990

[30] Foreign Application Priority Data

Jun. 6, 1989 [JP] Japan .................................. 1-143597

[51] Int. Cl.⁵ ........................ B32B 31/12; B32B 27/28
[52] U.S. Cl. .................................... 428/1; 428/473.5; 359/76; 359/103
[58] Field of Search .................. 428/1, 473.5; 350/350 R, 352, 330, 341

[56] References Cited

U.S. PATENT DOCUMENTS 4,879,059 11/1989 Hanyu et al. ......................... 428/1

Primary Examiner—Alexander S. Thomas
Attorney, Agent, or Firm—Oblon, Spivak, McClelland, Maier & Neustadt

[57] ABSTRACT

Disclosed herein is a substrate with a liquid crystal polymeric thin film comprising a substrate, an orientation film formed on said substrate and a thermotropic liquid crystal polymeric thin film formed on said orientation film, in which the orientation film comprises a polyimide having a glass transition point of higher than 300° C. obtained by cyclizing a polyamic acid or its derivative coated on said substrate and applying a rubbing treatment.

10 Claims, 1 Drawing Sheet

SUBSTRATE WITH A LIQUID CRYSTAL POLYMERIC THIN FILM AND METHOD FOR MANUFACTURING THE SAME

BACKGROUND OF THE INVENTION

The present invention relates to a substrate with a liquid crystal polymeric thin film and a method for manufacturing the same and, more in particular, the present invention relates to a substrate with a liquid crystal polymeric thin film fixed in a highly oriented state which has a light-controlling function and is suitable for use in the field of optoelectronics, etc., as well as a method for manufacturing the same.

When liquid crystal material is utilized as a device, it is generally necessary to arrange liquid crystals in a predetermined arrangement (orientation) and such molecular orientation varies depending on external effects such as electric field, magnetic field, shearing force or interface. Application use of the liquid crystal materials to various kinds of optoelectronics has been developed by utilizing the light-controlling function derived from such change of orientation.

Liquid crystals are generally classified into those of high molecular and low molecular materials. High molecular (polymeric) liquid crystals have a feature in which by fixing the oriented state of liquid crystals, the polymeric liquid crystals in the state of fixing their functions are used and they are applied in a field different from that of low molecular liquid crystals. For example, there can be mentioned application uses to orientation film for low molecular liquid crystals (as disclosed in Japanese Patent Application Laid-Open (KOKAI) 61-42618), non-linear optical device (as disclosed in Japanese Patent Application Laid-Open (KOKAI) 62-201419), circular polarizing filter and notch filter (as disclosed in Japanese Patent Application Laid-Open (KOKAI) 60-191203), optical memory (as disclosed in Japanese Patent Application Laid-Open (KOKAI) 62-66990) and color compensation plate for liquid crystal display. For practical use, it is necessary that a molecular orientation is controlled at a high level. For example, a color compensation plate for a liquid crystal display, more specifically, a color compensation plate for a super twisted nematic (STN) liquid crystal display is disposed between a liquid crystal cell and a polarization plate of a STN-type liquid crystal display for eliminating coloration due to the birefringence effect inherent to the STN liquid crystal display. The color compensation plate for the liquid crystal display serves to re-arrange elliptically polarized light having elliptic coefficient and azimuth angle which are made different depending on wavelength after passing through the cell into linearly polarized light of uniform azimuth angle again. Such a function can be developed only when the liquid crystal high molecular materials are oriented horizontally at a high degree of regularity and high homogenity in a certain direction.

By the way, a method of controlling the oriented state of low molecular liquid crystals by using an orientation film has already been established, which constitutes a fundamental technique for twisted nematic or STN liquid crystal display. On the other hand, as a method of controlling the oriented state of high molecular (polymeric) liquid crystals, a technique of orienting with higher order parameters than those of the low molecular liquid crystals, for example, a method of applying external force such as shearing stress, or a method of applying external force such as electric field or magnetic field has been known in a certain restricted region for any of nematic, smectic or cholestic liquid crystals. However, there is a drawback in such a method, that the control for orientation over a large area is impossible or the uniaxial orientation within a plane can not be controlled even if horizontal orientation can be conducted. That is, it can not be said that a technique capable of highly controlling the orientation of high molecular (polymeric) liquid crystals and fixing the oriented state has been established, and accordingly, it has been demanded for providing a substrate with a liquid crystal high molecular (polymeric) thin film which is fixed in a highly oriented state.

As a result of the present inventors' earnest studies, it has been found that liquid crystal polymeric materials in a substrate with a liquid crystal polymeric thin film obtained by coating a solution comprising a polyamic acid or its derivative as the essential ingredient on a substrate, cyclizing the polyamic acid or its derivative by heating, thereby forming a polyimide film having a glass transition point of higher than 300° C., applying a rubbing-treatment to the polyimide film, coating a thermotropic liquid crystal polymeric solution thereover, subjecting to heat-treatment at a temperature higher than the glass transition point of the liquid crystal polymer, and then cooling to a temperature lower than the glass transition point, are oriented in parallel with the substrate and oriented to a uniform direction within a plane in parallel with the substrate without division to domains. The present invention has been attained based on such a finding.

SUMMARY OF THE INVENTION

In a first aspect of the present invention, there is provided a substrate with a liquid crystal polymeric thin film comprising a substrate, an orientation film formed on the substrate and a thermotropic liquid crystal polymeric thin film formed on the orientation film, in which the orientation film comprises a polyimide having a glass transition point of higher than 300° C. obtained by cyclizing a polyamic acid or its derivative coated on the substrate and applying a rubbing treatment.

In a second aspect of the present invention, there is provided a method of manufacturing a substrate with a liquid crystal polymeric thin film, which comprises (a) coating a solution containing a polyamic acid or its derivative as the essential ingredient on a substrate, (b) cyclizing the polyamic acid or its derivative by heating, thereby forming a polyimide coating film having a glass transition point higher than 300° C., (c) applying a rubbing treatment to the polyimide film, (d) coating a thermotropic liquid crystal polymer solution on the polyimide coating film subjected to the rubbing treatment, and (e) after evaporizing the solvent to form a film of a liquid crystal polymer, subjecting the film to heat-treatment at a temperature higher than the glass transition point thereof and successively, cooling the film to a temperature lower than the glass transition point.

BRIEF DESCRIPTION OF THE ACCOMPANYING DRAWINGS

FIG. 1 is a schematic view for a substrate with a liquid crystal polymeric thin film according to the present invention, and FIG. 2 is a view for illustrating the method of producing a substrate with a liquid crystal polymeric thin film according to the present invention.

DETAILED DESCRIPTION OF THE INVENTION

The substrate with a liquid crystal polymeric thin film according to the present invention basically comprises a substrate, an orientation film formed on the substrate, and a thermotropic liquid crystal polymeric thin film formed on the orientation film. The orientation film comprises a polyimide having a glass transition point of higher than 300° C. obtained by cyclizing a polyamic acid or its derivative coated on the substrate and applying a rubbing treatment to the formed film.

Figure 1:
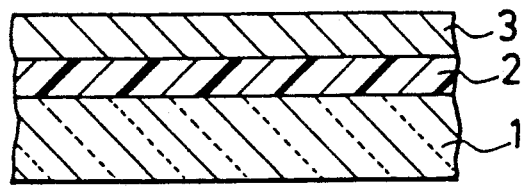
Figure 2A:
Figure 2B:
Figure 2C:
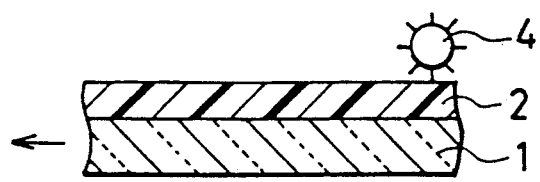
Figure 2D:
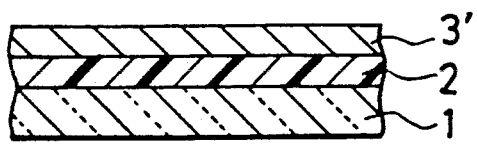
Figure 2E:
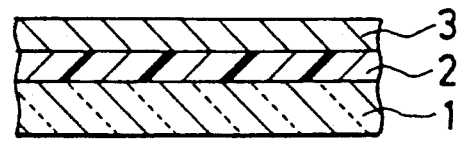

FIG. 1 is a schematic cross sectional view for a substrate with a liquid crystal polymeric thin film according to the present invention, in which are shown a substrate 1, an orientation film 2 (a polyimide film applied with rubbing treatment), and a thermotropic liquid crystal polymeric thin film 3.

As the substrate 1, optically transparent glass, plastic, ceramics, etc. can be used preferably. However, since the substrate 1 is heated to 100°–350° C. upon forming the polyimide film, use of such material that may cause deformation, etc. at such temperature should be avoided. Accordingly, as the plastic material for the substrate 1, apart from glass or ceramic material, there can be used heat resistant resin films of polyester such as polyethylene terephthalate, polyallylate, polyethylene naphthalate and polybutylene terephthalate; polyether sulfone; polysulfone; polyether ether ketone; and polyphenylene sulfide. Further, when the substrate with a liquid crystal polymeric thin film according to the present invention is utilized as an optoelectronic device, it is further required that the substrate has low birefringence. In such a case, plastics such as polyallylate, polyether sulfone, polysulfone and polyphenylene sulfide, glass and ceramics are preferred.

The orientation film 2 is a polyimide film subjected to a rubbing treatment and it is necessary that the polyimide has a glass transition temperature of higher than 300° C. The thickness of the polyimide film is within a range from 200 to 10,000 Å, preferably from 300 to 3,000 Å. If it is less than 200 Å, it is difficult to obtain uniform orientation and if it is greater than 10,000 Å, coloration (yellow) inherent to polyimide develops.

In addition, since the polyimide film is contacted directly with the liquid crystal polymeric solution upon manufacturing the substrate with a liquid crystal polymeric thin film according to the present invention, it is necessary that the film has a high solvent resistant (since a solvent is used for the preparation of the liquid crystal polymeric solution).

Referring, for instance, an orientation film prepared by applying a rubbing treatment to a coating film of a soluble polyimide which is already imidized and represented by the following formula (C-1) (C-2) or (C-3):

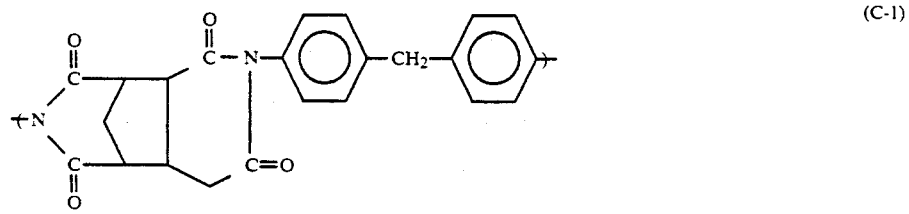
(C-1)

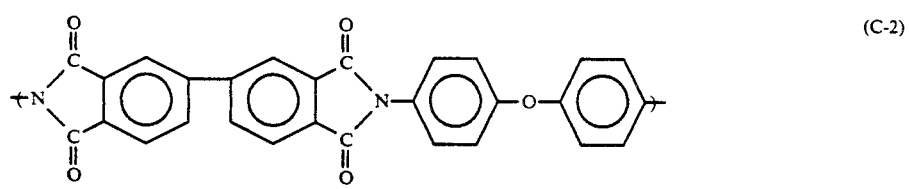
(C-2)

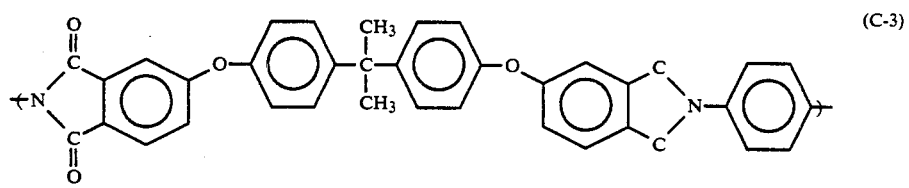
(C-3)

or a coating film of amide resin or soluble nylon represented by the following formula (C-4) or (C-5):

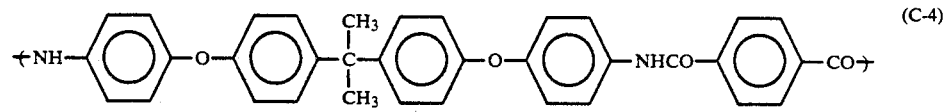
(C-4)

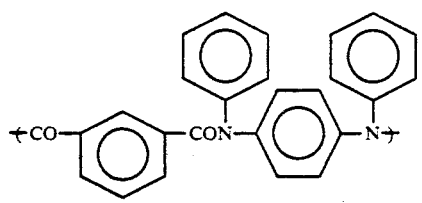

the orientation film 2 is dissolved or, if not dissolved, the orientation performance is extremely reduced or eliminated after coating the liquid crystal polymer solution.

Further, even when using a method of converting the formed polyamic acid coating film into an insoluble polyimide, orientation failure may locally occur if the glass transition point (Tg) of the polyimide is not more than 300° C. For example, if PIX1400 or PIX5400 (both with Tg=290° C., manufactured by Hitachi Chemical Co., Ltd.) which is well-known as an orientation agent for liquid crystal displays are used as the orientation film 2, although the uniaxial orientation is observed, orientation defect may be caused depending on the solvent for coating the liquid crystal polymer and mono-domain can not be obtained depending on the case. It is considered that since the inter-molecular attraction is weak in the material of low glass transition point, the orientation controlling effect is extremely reduced or lost completely due to swelling or partial dissolution of the surface thereof, even if not leading to the dissolution of the orientation film by the solvent used for coating the liquid crystal polymer.

With the reasons as described above, it is necessary in the present invention that the orientation film 2 is formed with a polyimide having a glass transition point higher than 300° C., preferably from 300° to 500° C., more preferably from 320° to 450° C. obtained by cyclizing the polyamic acid coated on the substrate 1 and, further, that the obtained orientation film 2 is subjected to a rubbing treatment for providing the liquid crystal polymer with uniaxial orientation control.

As typical examples of the polyimide used in the present invention, there can be exemplified those having the structural unit of the formulae (1) or (2):

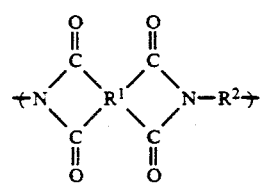

(1)

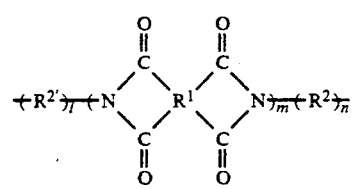

(2)

(in which $R^1$ represents (C-5)

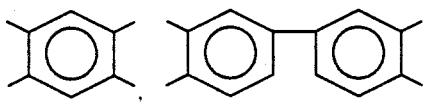

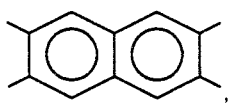

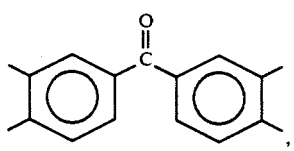

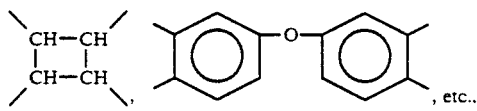, etc., $R^2$ and $R^{2'}$ represent respectively,

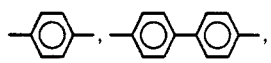

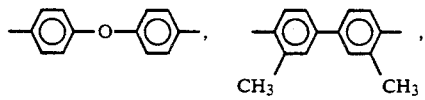

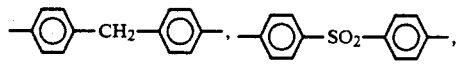

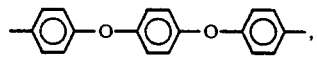

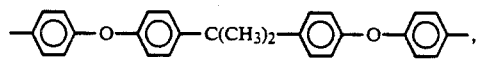

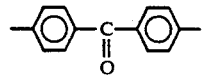

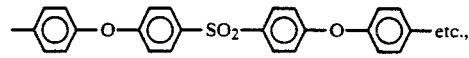 etc., l and n is not more than 50, respectively and l+n=50, and m is 50.

As specific examples, there can be exemplified:

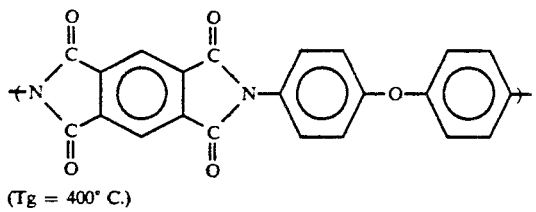
(Tg = 400° C.)

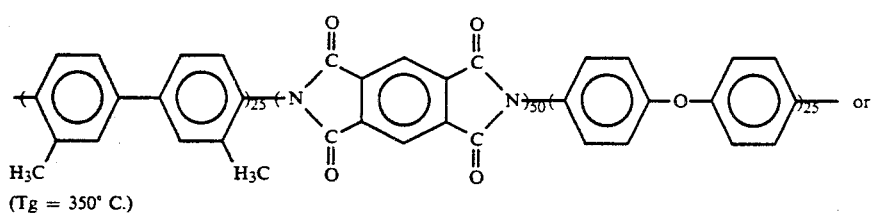
(Tg = 350° C.)

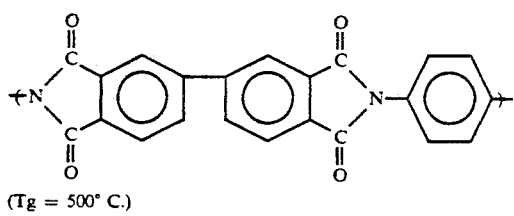
(Tg = 500° C.)

The material for forming the orientation film 2 is not restricted only to those described above, but those having refracting groups such as methylene chain and siloxane chain; ortho-substituted phenylene group; or cyclohexane group in the polyimide skelton are not preferred since the glass transition point (Tg) is greatly lowered.

The liquid crystal polymeric film 3 exhibits a thermotropic nature. As typical examples, there can be mentioned, specifically, main chain-type liquid crystal polymers having liquid crystalline residual group in the main chain, such as polyester, polyester amide, polycarbonate and polyether:

$-(M^1-X^1)(A^1-X^2)-$ wherein $X^1$ and $X^2$ represent respectively —COO—, —CONH—, —OCO—, —O— etc.,
$M^1$ represents —Ph—COO—Ph—,

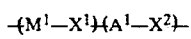

—Ph—Ph—,    —Ph—Ph—COO—Ph—,
—Ph—N=CH—Ph— etc.,
$A^1$ represents $-(CH_2)_{\overline{m}}$, $-(CH_2CH_2O)_{\overline{m}}$,

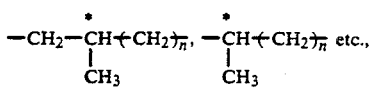

(wherein Ph represents a phenylene group,

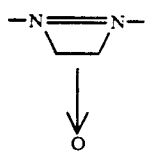

represents

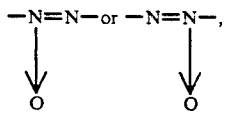

* represents an asymmetric carbon atom, and n represents an integer of 0 to 18),
vinylic and siloxane polymer represented by the following structural formula (5):

$$\begin{array}{c}-(L)-\\|\\A^2\\|\\M^2\end{array} \quad (5)$$

wherein L represents

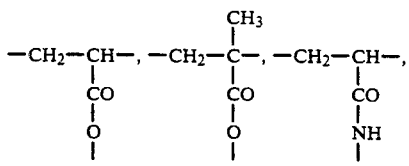

-continued

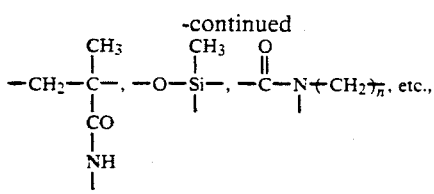

$A^2$ represents $-(CH_2)_m$, $-(CH_2CH_2O)_m$,

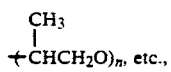

$M^2$ represents —Ph—Ph—$R^3$, —O—Ph—Ph—$R^3$, —Ph—COO—Ph—$R^3$, —O—Ph—COO—Ph—$R^3$, —Ph—COO—Ph—$R^3$, —O—Ph—OCO—Ph—$R^3$, —Ph—Ph—COO—Ph—$R^3$, —O—Ph—Ph—COO—Ph—$R^3$, —Ph—COO—Ph—Ph—$R^3$, —O—Ph—COO—Ph—Ph—$R^3$, —Ph—Ph—OCO—Ph—$R^3$, —O—Ph—OCO—Ph—Ph—$R^3$, —Ph—OCO—Ph—Ph—$R^3$ or —O—Ph—OCO—Ph—Ph—$R^3$ etc., (wherein $R^3$ represents hydrogen atom, ($C_1$-$C_{18}$) alkyl group, ($C_1$-$C_{18}$) alkoxy group, halogen atom, nitro group or cyano group and n represents an integer of 0 to 18), etc.

Method of manufacturing a substrate with a liquid crystal polymeric thin film according to the present invention will be described referring to FIG. 2.

(a) A coating film 2" comprising a polyamic acid or its derivative as the essential ingredient is formed on a substrate 1. For forming a coating film, a method of coating a solution of a polyamic acid on the substrate 1 by means of known spin coating method, dipping method, gravure coating method or roll coating method, and then heating in order to remove the solvent is preferred. The concentration of the solvent is within a range from 0.1 to 10%, although different depending on the coating method. As the solvent usable herein, there can be exemplified N,N-dimethylformamide, N,N-dimethylacetoamide, N-methylpyrrolidone, γ-butyrolactone, N-methylcaprolactam, dimethylsulfoxide and hexamethylphosphoamide.

(b) The polyamic acid coated is cyclized by heating to form a polyimide film 2'. A temperature thereof is within a range about from 100° to 350° C. and, preferably 130° to 350° C.

(c) A rubbing treatment is applied to the surface of the thus formed polyimide film 2' in one direction by using rubbing material 4. As the rubbing material 4, cloth or planted cloth of cotton, polyester, nylon, etc., or sponge of urethane or nylon is suitably used. Rubbing load is from 1 to 200 g/cm², preferably, 20 to 150 g/cm². The surface of the polyimide film is uniformly oriented in the rubbing direction by the rubbing treatment.

Different from usual liquid crystal displays, orientation is controlled on a single substrate, that is, only one side of the liquid crystal polymeric coating film is in contact with the orientation film, while the other side thereof is exposed to a surrounding atmosphere (usually air) in the present invention. Therefore, if the surface tention of the liquid crystal polymer is less than that of the orientation film, the liquid crystal polymer may some time be repelled during heat-treatment failing to obtain a homogenous film. In view of the above, the surface tention of the orientation film is not less than 35 dyne/cm, preferably not less than 40 dyne/cm, although different depending on the kind of the liquid crystal polymer used.

(d) A solution 3' containing a thermotropic liquid crystal polymer dissolved in an organic solvent is coated on the polyimide orientation film 2. Although different depending on the kind and the polymerization degree of the liquid crystal polymer used herein, as the solvent for the liquid crystal polymer halogenated hydrocarbons such as chloroform, dichloroethane, trichloroethane, trichloroethylene, tetrachloroethylene and o-dichlorobenzene; a mixed solvent of the halogenated hydrocarbons and phenolic solvents such as phenol, o-chlorophenol or cresol; aprotonic polar solvents such as dimethylformamide, dimethylacetoamide, dimethylsulfoxide or N-methylpyrrolidone; and ether solvents such as tetrahydrofuran or dioxane may be used. The concentration for the solution varies depending on the coating method, the viscosity of the polymer, etc. It is usually within a range from 5 to 50% by weight, preferably from 10 to 30% by weight. As the coating method, there may be employed, for example, spin coated method, roll coating method, gravure coating method or dipping method.

(e) The solvent is removed by drying, a heat-treatment is applied at a predetermined temperature higher than the glass transition point of the liquid crystal polymer for a predetermined period of time to complete mono-domain liquid crystal orientation and, thereafter, it is cooled to a temperature lower than the glass transition point. The temperature for the heat-treatment is selected from the temperature higher than the glass transition point of the liquid crystal polymer. In view of promoting the orientation due to the interface effect of the orientation film, lower viscosity of the polymer is better and accordingly, higher temperature is preferred for the heat-treatment. However, excessively high temperature is not preferred since it leads to the increased cost and worsening of the operationability. Further, the liquid crystal polymer has an anisotropic phase in a higher temperature region than the nematic phase depending on the kind of the liquid crystal polymer, but uniform orientation can not often be obtained with a heat-treatment in such a temperature range. As described above, it is necessary that the temperature for the heat-treatment is higher than the glass transition point of the liquid crystal polymer and also preferred that it is less than the transition point to the anisotropic phase. Generally, a temperature of 50° to 300° C., more preferably 100° C. to 250° C. is preferred. Further, as has been described previously, it is preferred that the liquid crystal polymer is in a nematic or cholesteric phase at the treating temperature in view of a relationship with the phase of the liquid crystal polymer and no uniform orientation can be obtained in the smectic phase because of high viscosity. The heat-treatment time required for obtaining a sufficient orientation in a liquid crystal state on the orientation film can not be generally defined depending on the composition and the molecular weight of the polymer, but a heat-treatment time of 10 sec to 60 min, more preferably 30 sec to 30 min is preferred. If it is shorter than 10 sec, the orientation is insufficient and, if it is longer than 60 min, the productivity is undesirably lowered.

After the completion of the liquid crystal orientation, the liquid crystal polymeric film is cooled to a temperature lower than the glass transition point with in order to fix the orientation. There is no particular restriction for the cooling rate and a method of merely allowing the film to cool down from heating atmosphere temperature to an atmosphere temperature of lower than the glass transition point may be used. If it is assumed that the substrate with a liquid crystal polymeric thin film is used near a room temperature, when fixing the orientated state of the liquid crystals by cooling to lower than the glass transition point, the glass transition point of the liquid crystal polymer is preferably not lower than 30° C., more preferably not lower than 50° C. If the glass transition point is lower than 30° C., the fixed liquid crystal structure may some time be changed when used near the room temperature.

The film thickness of the liquid crystal polymer 3 is preferably within a range not more than 100 μm and, more preferably 0.02 to 50 μm. If it is greater than 100 μm, it is difficult to obtain uniform orientation.

As the polyamic acid and its derivative in the present invention, there can be exemplified those having structural units of the following formulae:

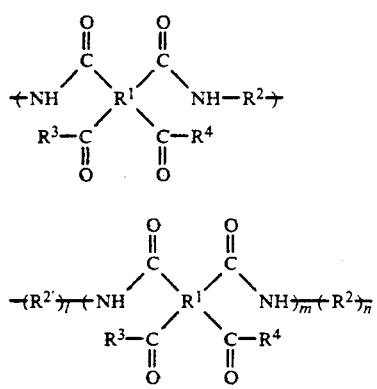

wherein $R^1$, $R^2$, $R^{2'}$, l, m and n have the same meanings as defined above, and $R^3$ and $R^4$ represent, respectively, OH or ($C_1$-$C_6$)alkoxy group.

It is necessary that the conversion ratio of the polyamic acid or its derivative to polyimide (imidization ratio) is not less than 70%, preferably not less than 80%, more preferably not less than 85%. The imidization ratio generally goes higher as the treating temperature is higher.

As has been described above, it is preferred that the liquid crystal polymer has preferably a cholesteric phase or a nematic phase in the phase series thereof and the liquid crystal polymer wherein the heat-treatment can be applied in a temperature range for both of the phases is preferred. As the liquid crystal polymers capable of satisfying such conditions, the polyesters represented by the following formula can be exemplified.

$$+O-Ar^1-CO+ \quad +O-Ar^2CO+$$

$$+O-Ar^1-O+ \quad +CO-Ar^2CO+$$

$$+O-Ar^2-O+ \quad +CO-Ar^1CO+$$

wherein $Ar^1$ represents

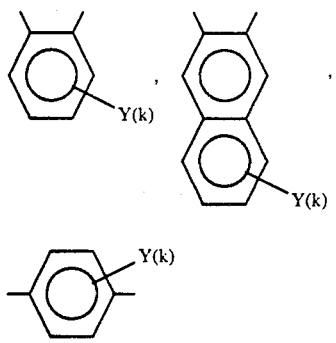

(in which Y represents hydrogen atom, halogen atom, ($C_1$-$C_4$) alkyl group, ($C_1$-$C_4$) alkoxy group or phenyl group and k is 0, 1 or 2),

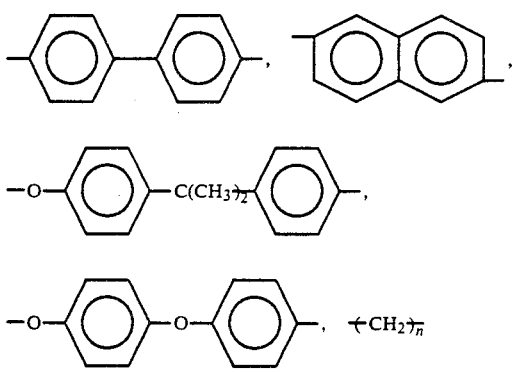

(in which n is an integer of 2 to 12), $$-O-CH_2CH-CH_2CH_2O- \quad \text{or}$$
$$\qquad\quad | $$
$$\qquad\quad CH_3$$

$$-OCH_2CH_2CH-CH_2CH_2CH_2O-$$
$$\qquad\qquad\quad |$$
$$\qquad\qquad\quad CH_3$$

$Ar^2$ represents

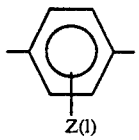

(in which Z represents hydrogen atom, halogen atom, ($C_1$-$C_4$) alkyl, ($C_1$-$C_4$) alkoxy group or phenyl group and, l is 0, 1 or 2),

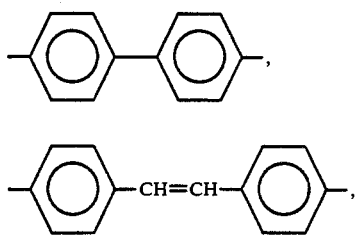

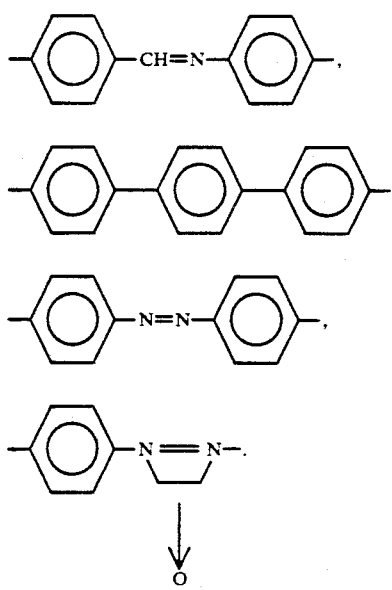
Specifically, polyesters having the following structural units can be exemplified:
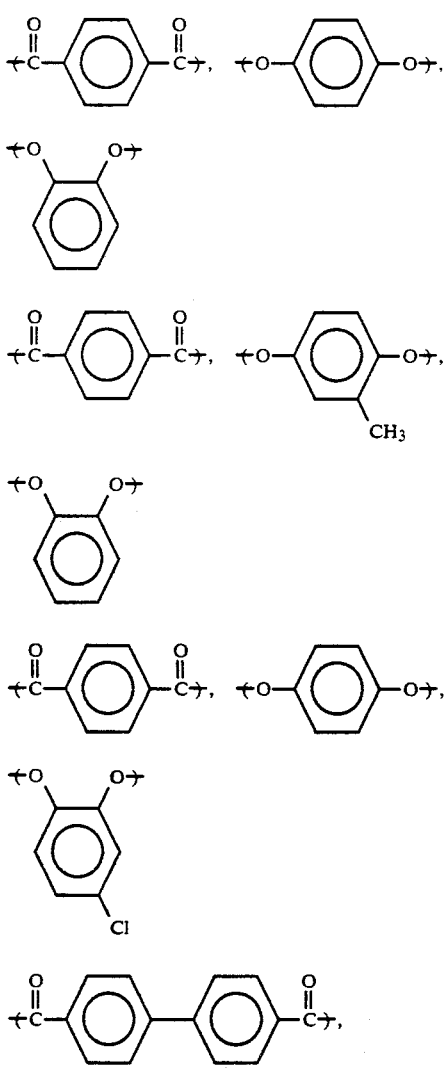
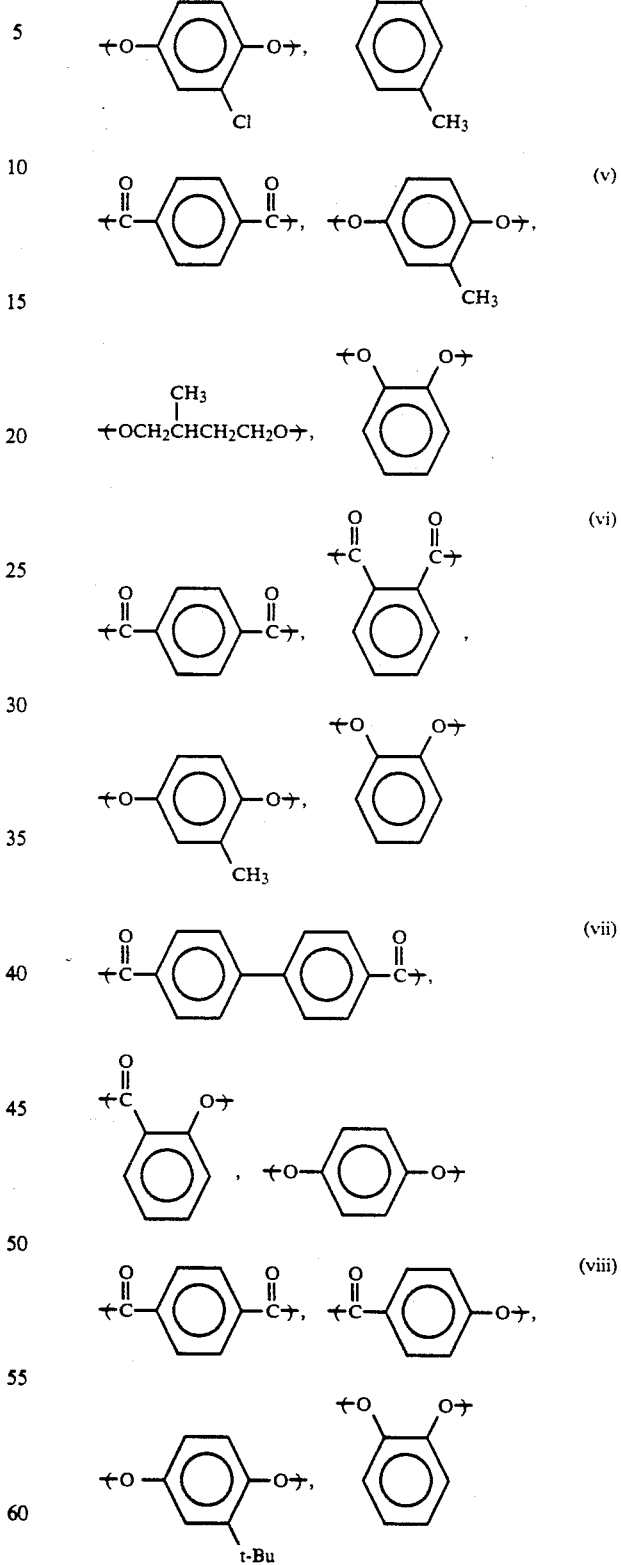
As the structural unit for the polyester, those having o-substituted aromatic unit are preferred and, as specific examples of polyesters containing o-substituted aromatic units, those compounds having the following structural units are preferred:

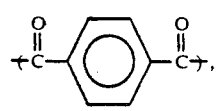

(ii)

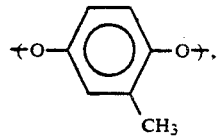

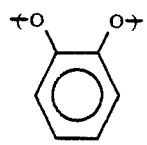

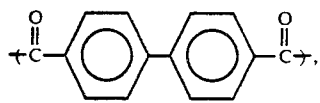

(iv)

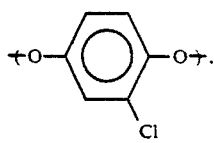

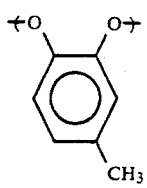

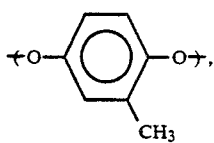

$+OCH_2\overset{CH_3}{\underset{|}{C}H}CH_2O+$,

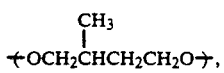

(vi)

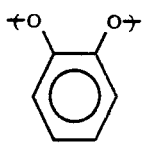

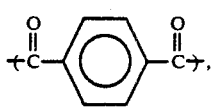

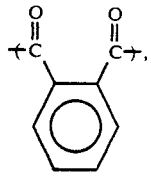

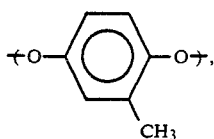

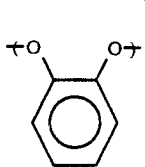

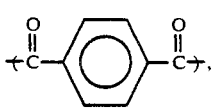

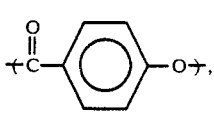

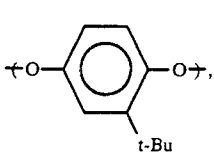

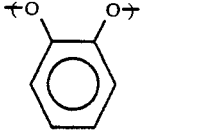

(viii)

In the substrate with a liquid crystal polymeric thin film according to the present invention, the liquid crystal polymer may be introduced with optically active groups, or incorporated with liquid crystal high molecular compound, liquid crystal low molecular compound, non-liquid crystal material, etc. having optically active groups so that it exhibits a cholesteric phase.

As the application uses, there can be mentioned elliptically polarized filter, notch filter, optical memory or light memory utilizing selective reflection of the cholesteric phase, color compensation plate, for STN-type liquid crystal display device, etc. In this case, molecules of the liquid crystal polymer in contact with the orientation film are oriented in parallel with the rubbing direction and form a twisted structure corresponding to the pitch of the liquid crystal polymer in the thickness direction.

When the substrate with a liquid crystal polymeric thin film according to the present invention is observed by a polarization microscope under the cross Nicol arrangement, the following results are obtained.

(i) When the rubbing direction is in parallel with the transmission axis of the polarization plate, a completely dark visual field is obtained and, when the specimen is rotated by 45°, it turns to a substantially colorless bright visual field corresponding to the retardation of the film.

(ii) The uniform birefringence over the entire surface is observed and the orientation direction at the surface of the orientation film is in parallel with the rubbing direction in which high orientation state with highly horizontal and controlled orientation direction is fixed.

There are no such defects at all as (iii) division into minute domains is observed, (iv) change of the brightness is scarcely observed even upon rotating the specimen, and (v) non oriented area is locally observed.

Also, the substrate with a liquid crystal polymeric thin film according to the present invention is excellent showing less defect ratio, for example, the number of defects in 1 mm×1 mm area is less than 10, preferably less than 5.

Further, the following advantageous effects can be provided.

(1) Since the liquid crystal polymeric film is manufactured by a wet coating method, the thin film can be prepared at a high accuracy. A thin film of from several μm to several tens μm can be formed at a solution concentration of about from 10 to 30% by weight although depending on the viscosity of a liquid crystal polymer or the coating method, and a thin film of about 1 μm thickness can be formed at a good accuracy with a concentration of about 1 to 5% by weight.

(2) Since the polyimide orientation film used is defined to a heat-cyclized polyimide having a glass transition point of higher than 300° C., degradation in the orientation performance is not observed at all even in the coating step for the liquid crystal polymeric solution as in the item (1) above and higher orientation with higher horizontal state than that of the low molecular liquid crystal and with controlled orientation degree can be realized.

(3) High orientation control and fixing thereof can be attained in a state in which only one surface of the liquid crystal polymeric film contacts with the orientation film, while the other surface thereof is set free, for example, in a state contacted with an air. Generally, the orientation for the liquid crystal is usually controlled by contacting both of the interfaces with the orientation film and it is said that the molecular orientation at the air interface is not uniform if the one surface is adjacent with the air, and no uniform orientation can not be obtained over the entire region along the thickness of the film by such an effect. In the case of the present invention, there is a remarkable feature that monodomain twisted nematic orientation can be attained and further fixed by the control only to the one surface.

That is, in the substrate with a liquid crystal polymeric thin film according to the present invention, the orientation direction of the liquid crystal polymer is controlled (uniaxially oriented) and a degree of uniaxial orientation thereof is high. For instance, the degree of uniaxial orientation is not less than 20, preferably not less than 50.

In the substrate with a liquid crystal polymeric thin film according to the present invention, after the liquid crystals are applied with orientation control in the liquid crystal phase into a certain molecular orientation and then cooled to a temperature for a solid phase, since the liquid crystal polymer has a high viscosity in the liquid crystal state, re-arrangement of the molecules can not follow the change of temperature and accordingly, the arrangement in the liquid crystal phase is maintained as it is in the solid phase.

(4) The substrate with a liquid crystal polymeric thin film according to the present invention may be used as it is, or a protection layer of transparent plastic may be disposed thereon for the protection of the surface. Further, it may be used in combination with other optical device such as a polarization plate. As has been described above, since the substrate with a liquid crystal polymeric thin film according to the present invention is excellent in uniformness, has excellent optical performance derived from the highly oriented state, as well as can be produced at a less production cost and with high productivity, it is of an extremely great industrial value in the field of liquid crystal display compensation plate, optical plate filter, memory medium, etc.

EXAMPLES

The present invention will be more precisely explained while referring to Examples as follows.

However, the present invention is not restricted to examples under mentioned. From the foregoing description, one skilled in the art can easily ascertain the essential characteristics of the present invention, and without departing from the spirit and scope thereof, can made various changes and modifications of the invention to adapt it to various usages and conditions.

Polarization microscopic spectrophotometer TFM-120 AFT manufactured by Oak Seisakusho Co. and FP800 thermosystem manufactured by Mettler Co. were used, a polarizer was arranged so as to make an angle of 45° relative to the rubbing direction and an analyzer was rotated to set such that the amplitude for the birefringence spectrum was maximum. The optical transmittance at wavelength with which the transmittance became maximum and minimum was measured. Then, the analyzer was rotated so as to make a 90° angle with respect to the rubbing direction and the transmittance ratio at the identical wavelength was measured. The ratio of the transmittances at 45° and 90° C. at identical wavelength was set as "a degree of uniaxial orientation" (wherein the value is calculated by setting the smaller value for the transmittance ratio as a denominator).

EXAMPLE 1

N-methyl-2-pyrrolidone solution containing 2.5% by weight of a polyamic acid represented by the following formula (6):

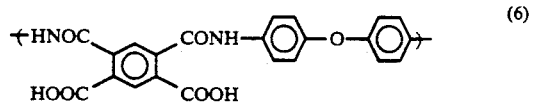

(6)

was coated on a glass substrate by means of spin coating method and then dried at 70° C. for 10 min to form a polyamic acid coating film of about 1000 Å in thickness. Then, the substrate was heated at 270° C. for one hour in order to cyclize polyamic acid, thereby obtaining a substrate on which a polyimide film of the following formula (7) was formed:

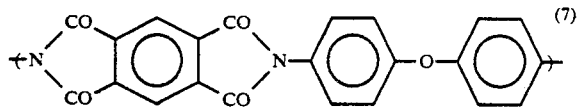

The glass transition point of the polyimide having the above-mentioned structure, determined by a a differential heat scanning calorimeter was 400° C. Rubbing treatment was applied in one direction for the surface of the polyimide film with cotton planted cross under a load of about 50 g/cm² to manufacture a substrate with an orientation film.

Then, a polyester liquid crystal polymer represented by the following formula (8):

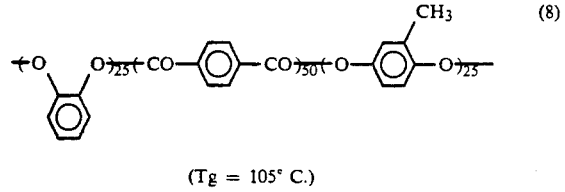

($T_g$ = 105° C.)

was dissolved in 1,1,2,2-tetrachloroethane to prepare a 15 wt % solution. The polyester solution was coated on the orientation film of the substrate with an orientation film by means of spin coating method and then dried at 70° C.

Successively, the obtained specimen was subjected to heat-treatment at 190° C. for 5 min in an air thermostable bath, then taken out from the bath and allowed to cool down to conduct fixing for the orientation. The resultant polyester film had a thickness of about 1.1 μm, which was completely transparent and smooth film. When the orientation state of the film was observed by a polarization microscope under cross Nicol arrangement, a complete dark visual field was obtained when the rubbing direction was in parallel with the transmission axis of the polarization plate, while a substantially colorless bright visual field corresponding to the retardation (about 0.13 μm) of the film was observed when the obtained specimen was rotated by 45°. Thus, it was confirmed that uniaxial horizontal orientation was obtained. Further, no defects were found at all over the entire surface of the specimen sized 120 mm×120 mm.

EXAMPLE 2

On a substrate subjected to orientation treatment, manufactured in the same procedures as in Example 1, a tetrachloroethane solution of 15 wt % concentration containing a polyester represented by the formula (8) described above and an optical active polyester represented by the following formula (9) at the weight ratio of 95:5 was coated by means of screen printing method and then dried at 70° C. Subsequently, heat-treatment and fixing-treatment were applied under the same conditions as those in Example 1. The resultant polyester film had a thickness of about 6.7μ, which was completely transparent and smooth film.

When the oriented state of the film was observed by a polarization microscope under cross Nicol arrangement, uniform birefringence color was observed over the entire surface and no defects were found at all. Further, as a result of polarization analysis, the film was twisted by 240° in the direction of thickness and the orientation direction on the surface of the polarization film was in parallel with the rubbing direction.

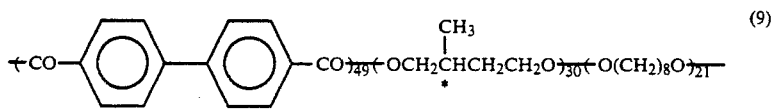

EXAMPLE 3

A substrate with a liquid crystal polymeric thin film was prepared in the same procedures as in Example 2 except for preparing a polyimide orientation film by using N-methylpyrrolidone solution at 2.5 wt % concentration of a polyamic acid represented by the following formula (10) as the polyamic acid. Excellent orientation property was also confirmed for the film like that in Example 2.

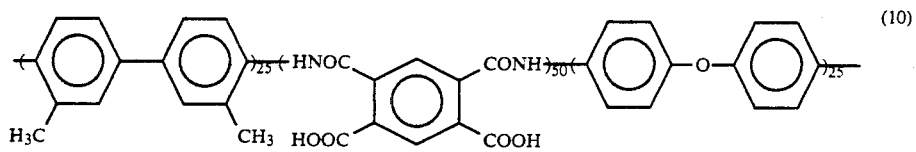

EXAMPLE 4

A substrate with a liquid crystal polymeric thin film was prepared in the same procedures as in Example 2 except for preparing a polyimide orientation film of about 800 Å in thickness by using N-methylpyrrolidone solution at 2.5 wt % concentration of a polyamic acid represented by the following formula (11) as the polyamic acid. Excellent orientation property was also confirmed for the film like that in Example 2.

(Polyamic acid)

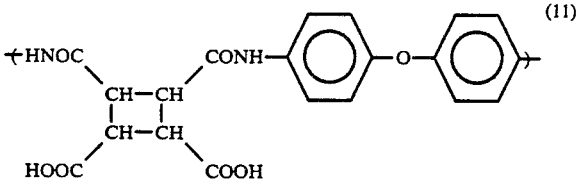

(Polyimide)

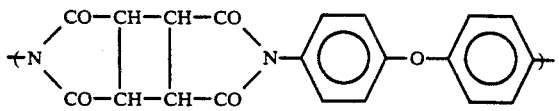

-continued (with no Tg. decomposition point 456° C.)

EXAMPLE 5

A substrate with a liquid crystal polymeric thin film was manufactured in the same procedures as in Example 2 except for using an N-methylpyrrolidone solution at 2.5 wt % concentration of polyimide having a isoindoloquinazolinedione skelton (LQ5200 manufactured by Hitachi Chemical Co., Ltd.) as the polyamic acid. The glass transition point of the cured film of LQ5200 was higher than 400° C. Also in this case, excellent orientation property was confirmed like that in Example 2.

COMPARATIVE EXAMPLE 1

A γ-butyrolactone solution containing 2.5 wt % of a soluble polyimide represented by the following formula (12) was coated by means of spin coating method on a glass substrate, dried at 120° C. (film thickness of about 1000 Å) and then subjected to a rubbing treatment. Using the thus obtained substrate with orientation treatment and further using the same liquid crystals as those in Example 1, a substrate with a liquid crystal polymeric thin film was manufactured. The specimen was clouded and, when the oriented state was observed by a polarization microscope under cross Nicol arrangement, a plurality of minute domain divisions were observed, and there was no substantial change in the brightness when the obtained specimen was rotated.

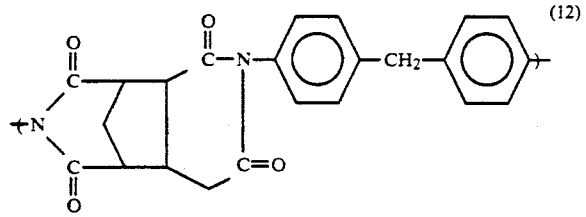
(12)

COMPARATIVE EXAMPLE 2

N-methylpyrrolidone solution containing 2.5 wt % of a polyamic acid (PIX1400 manufactured by Hitachi Chemical Co., Ltd.) was coated by spin coating method on a glass substrate, dried at 70° C. and heated at 270° C. for one hour to form a polyimide having isoindoloquinazolinedione ring. The polyimide had a glass transition point of 290° C. By using the thus obtained substrate subjected to orientation treatment and also using the same liquid crystals as those in Example 1, a substrate with a liquid crystal polymeric thin film was manufactured. While the obtained specimen showed substantially transparent appearance, non-oriented areas were observed locally by a polarization microscope under cross Nicol arrangement.

A degree of uniaxial orientation and number of defects in 1 mm × 1 mm area measured by a microscope in Examples and Comparative Examples are shown in Table 1.

TABLE 1

| | Degree of uniaxial orientation | | Rate of defects |
|---|---|---|---|
| | Liquid crystal state (during heat-treatment) | After fixing | (number of defects in 1 mm × 1 mm) |
| Example 1 | 110 | 102 | 0 |
| Example 2 | 110 | 102 | 0 |
| Example 3 | 80 | 70 | 0 |
| Example 4 | 120 | 95 | 0 |
| Example 5 | 136 | 125 | 0 |
| Comparative Example 1 | 1 | 1.1 | not less than 200 |
| Comparative Example 2 | 7 | 2 | not less than 100 |

What is claimed is:

1. A substrate with a liquid crystal polymeric thin film comprising a substrate, an orientation film formed on said substrate and a thermotropic liquid crystal polymeric thin film formed on said orientation film, in which the orientation film comprises a polyimide having a glass transition point of higher than 300° C. obtained by cyclizing a polyamic acid or its derivative coated on said substrate and applying a rubbing treatment.

2. A substrate with a liquid crystal polymeric thin film according to claim 1, wherein the polyimide has a structural unit represented by the following formula:

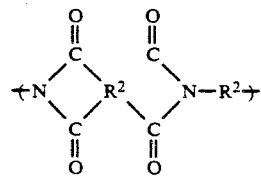

or

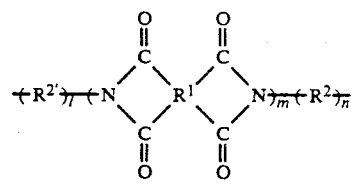

wherein $R^1$ represents

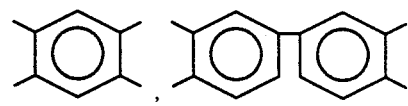
,

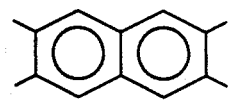
,

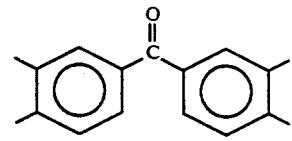
,

[structure with CH-CH cyclobutane fused to diphenyl ether with methyl groups]

$R^2$ and $R^{2'}$ represent respectively,

[phenylene], [biphenyl],

[diphenyl ether], [dimethyl biphenyl with CH₃ groups],

[-Ph-CH₂-Ph-], [-Ph-SO₂-Ph-],

[-Ph-O-Ph-O-Ph-],

[-Ph-O-Ph-C(CH₃)₂-Ph-O-Ph-],

[-Ph-CO-Ph-],

[-Ph-O-Ph-SO₂-Ph-O-Ph-], and l and n is not more than 50, respectively and l+n=50, and m is 50.

3. A substrate with a liquid crystal polymeric thin film according to claim 1, wherein the liquid crystal polymeric film comprise a main chain-type liquid crystal polymer having liquid crystalline residual group on the main chain, represented by the following structural formula:

$-(M^1-X^1)(A^1-X^2)-$ wherein $X^1$ and $X^2$ represent respectively —COO—, —CONH—, —OCO— or —O—,
$M^1$ represents —Ph—COO—Ph—, —Ph—N=N—Ph—,
         ↓
         O —Ph—Ph—,    —Ph—Ph—COO—Ph— or
—Ph—N=CH—Ph—, $A^1$ represents $-(CH_2)_n$, $-(CH_2CH_2O)_n$, $-(CH_2CH_2O)_n$
    |
    CH₃

$-CH_2-\overset{*}{CH}-(CH_2)_n$, $-\overset{*}{CH}-(CH_2)_n$.
        |                        |
        CH₃                      CH₃

(wherein Ph represents a phenylene group,

—N=N—
    ↓
    O represents

—N=N— or —N=N—,
    ↓         ↓
    O         O

* represents an asymmetric carbon atom, and n represents an integer of 0 to 18),
a vinylic and siloxane polymer represented by the following structural formula (5):

$$-(L)-\atop{\phantom{-}|\phantom{-}}\atop{A^2}\atop{\phantom{-}|\phantom{-}}\atop{M^2}$$ (5)

wherein L represents $-CH_2-CH-$, $-CH_2-\underset{CO}{\overset{CH_3}{\underset{|}{\overset{|}{C}}}}-$, $-CH_2-CH-$,
        |                                    |
        CO                                   CO
        |                                    |
        O                                    NH
        |                                    |

$-CH_2-\underset{CO}{\overset{CH_3}{\underset{|}{\overset{|}{C}}}}-$, $-O\underset{|}{\overset{CH_3}{\underset{|}{\overset{|}{Si}}}}-$ or $-\overset{O}{\overset{\|}{C}}-N-(CH_2)_n$,
        |                                                            |
        NH $A^2$ represents $-(CH_2)_n$, $-(CH_2CH_2O)_n$ or $-(CHCH_2O)_n$,
    |
    CH₃

M represents —Ph—Ph—R³, —O—Ph—Ph—R³, —Ph—COO—Ph—R³, —O—Ph—COO—Ph—R³, —Ph—COO—Ph—R³, —O—Ph—OCO—Ph—R³, —Ph—Ph—COO—Ph—R³, —O—Ph—Ph—COO—Ph—R³, —Ph—COO—Ph—Ph—R³, —O—Ph—COO—Ph—Ph—R³, —Ph—Ph—OCO—Ph—R³, —O—Ph—OCO—Ph—Ph—R³, —Ph—OCO—Ph—Ph—R³ or —O—Ph—OCO—Ph—Ph—R³ etc., (wherein R³ represents hydrogen atom, ($C_1$-$C_{18}$) alkyl group, ($C_1$-$C_{18}$) alkoxy group, halogen atom, nitro group or cyano group and n represents an integer of 0 to 18)].

4. A substrate with a liquid crystal polymeric thin film according to claim 3, wherein the liquid crystal polymeric film comprises a polyester.

5. A substrate with a liquid crystal polymeric thin film according to claim 4, wherein the polyester has the following structural unit:

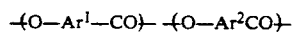

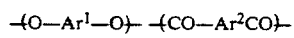

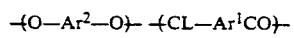

wherein Ar² represents

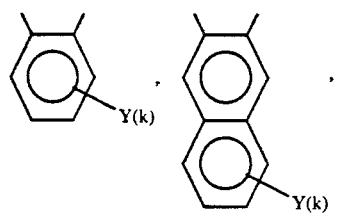

(wherein Y represents hydrogen atom, halogen atom, (C₁-C₄) alkyl group, (C₁-C₄) alkoxy group or phenyl group and k is 0, 1 or 2),

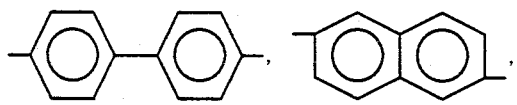

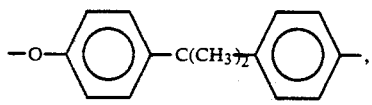

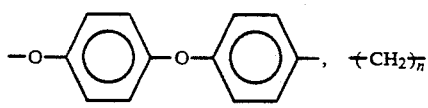

(wherein n is an integer of 2 to 12),

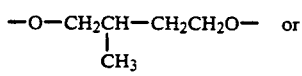

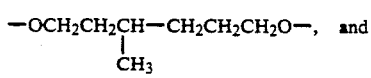

Ar² represents

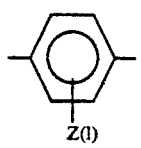

(wherein Z represents hydrogen atom, halogen atom, (C₁-C₄) alkyl group, (C₁-C₄) alkoxy group or phenyl group and l represents 0, 1 or 2),

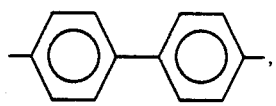

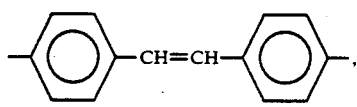

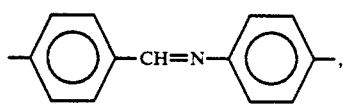

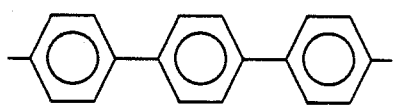

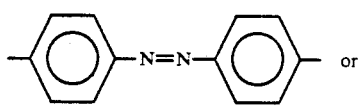  or

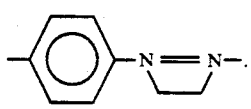

6. A substrate a with liquid crystal polymeric thin film according to claim 5, wherein the polyester contains o-substituted aromatic unit.

7. A substrate with a liquid crystal polymeric thin film according to claim 5, wherein the polyester containing the o-substituted aromatic unit comprises the following structural units:

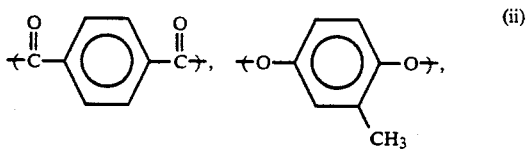 (ii)

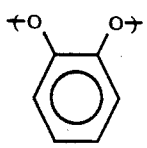

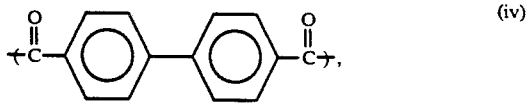 (iv)

-continued

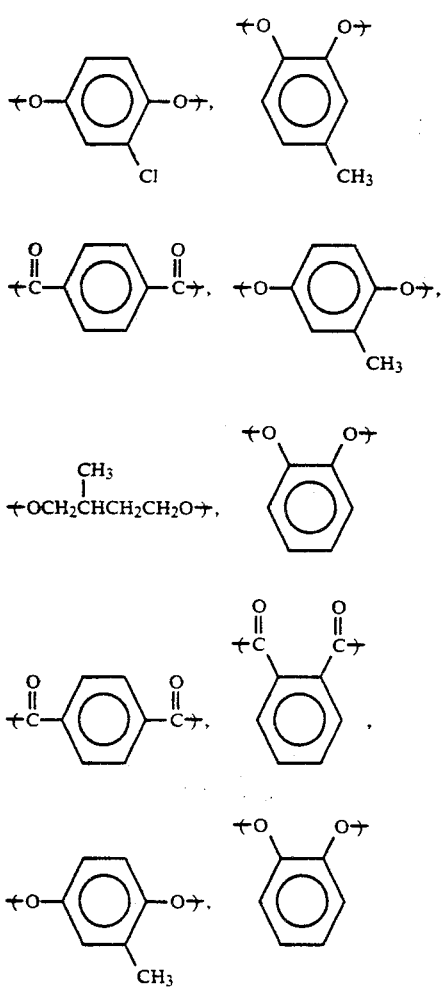

(vi)

-continued

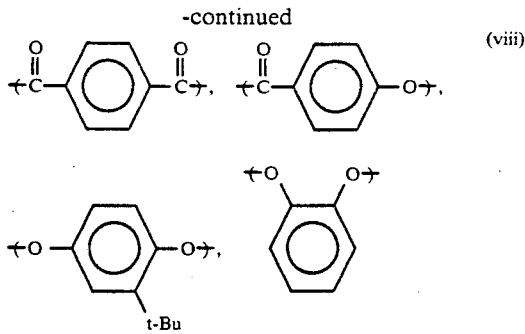

(v)

(viii)

8. A method of manufacturing a substrate with a liquid crystal polymeric thin film, which comprises
   (a) coating a solution comprising polyamic acid or its derivative as the essential ingredient on the substrate,
   (b) cyclizing the polyamic acid or its derivatives by heating-treatment, thereby forming a polyimide coating film having a glass transition point of higher than 300° C.,
   (c) applying a rubbing treatment to said polyimide film,
   (d) coating a solution of a thermotropic liquid crystal polymer on the polyimide coating film subjected to rubbing treatment, and
   (e) evaporating the solvent to form a coating film of a liquid crystal polymer, maintaining at a temperature higher thin the glass transition point thereof and subsequently, cooling it to a temperature lower than the glass transition point.

9. A manufacturing method according to claim 8, wherein the heat-treatment in the step (b) is carried out at a temperature from 100° to 350° C.

10. A manufacturing method according to claim 8, wherein the heat-treatment in the step (e) is carried out at a temperature from 50° to 300° C.

* * * * *